Jan. 5, 1954     H. L. BILHARTZ ET AL     2,664,744

HOLDER FOR CORROSION TESTING COUPONS

Filed March 9, 1953

ATTEST:
Clarence R. Patty, Jr.

INVENTORS
HARRELL L. BILHARTZ
HOWARD E. GREENWELL
BY Norbert E. Birch
ATTORNEY

Patented Jan. 5, 1954

2,664,744

UNITED STATES PATENT OFFICE 2,664,744

HOLDER FOR CORROSION TESTING COUPONS

Harrell L. Bilhartz and Howard E. Greenwell, Dallas, Tex., assignors to The Atlantic Refining Company, Philadelphia, Pa., a corporation of Pennsylvania Application March 9, 1953, Serial No. 341,302

5 Claims. (Cl. 73—86)

This invention relates to apparatus for use in determining the corrosiveness of fluids, and more particularly to a device for holding metallic coupons in a conduit through which fluid flows whereby the corrosiveness of said fluid may be determined by observing the effects thereof upon said coupons.

Although this invention is applicable to many other fields, it was developed particularly for use in connection with determining the corrosiveness of well fluid in order to determine the necessity for treating the surfaces of well tubing and other well accessories with corrosion inhibiting substances. It is well known that many well fluids, particularly those containing substantial amounts of salt water, are highly corrosive and therefore tend to destroy the well tubing through which they flow, as well as pumping apparatus and other auxiliary equipment with which they come in contact, unless these metallic surfaces are treated to resist corrosion.

Since not all well fluids are corrosive, and since some of those which are not corrosive may become so as the water-to-oil ratio thereof increases, it is important to make frequent observation of the corrosiveness of well fluids in order to determine whether they are sufficiently corrosive to require the treatment of the metallic surfaces with which they come in contact. Additionally, it is desirable to maintain a check on the corrosiveness after treatment in order to determine the effectiveness of the treating agent in reducing corrosion.

An accepted method for determining the corrosiveness of fluids is to place in a stream thereof a metallic plate or coupon of known weight and known corrosion characteristics, leave it exposed to the fluid for a measured period of time, and then weigh it after exposure. The loss of weight of the coupon during exposure to the fluid, thus serves as an indication of the corrosiveness of the fluid.

It has been found that metallic coupons placed in metallic conduits to determine the corrosiveness of the fluids flowing therethrough may be affected by the galvanic action between the metal of the coupon and the metal of the conduit as well as by the electrolytic action of stray currents, if they are permitted to come into contact with the conduit. When this occurs, a portion or all of the weight lost by the coupon during exposure to the fluid may be the result of such galvanic or electrolytic action, so that it is impossible to determine the corrosiveness of the fluid by measuring the loss of weight of the coupon. Therefore, in the making of accurate determinations of the corrosiveness of fluids, it is essential that the metallic coupons which are exposed to the fluid be electrically isolated from the metallic conduit through which the fluids pass.

Numerous devices are available for supporting coupons in conduits for contact by fluids flowing therethrough but substantially all of these comprise plugs, or similar devices, which are adapted to be installed at a point where the conduit changes directions, as for instance at a cross or at a 90° turn, and in which the coupon is supported at only one end. In installations of this type, it is essential that the coupon have sufficient width and breadth to resist the bending forces resulting from the turbulence of the fluid due to the change in direction; since the coupon might otherwise be bent into contact with the conduit or might flutter and thus establish intermittent contact therewith. Thus, because the coupons used in installations of this type must be relatively rigid, their weight is usually great with respect to the surface exposed to the fluid. On the other hand, it will be appreciated by those familiar with corrosion studies that it is desirable to have a high surface-to-weight ratio in coupons used to measure corrosiveness in order that any weight lost by the coupon during exposure to a corrosive fluid will appear as a high percentage of the original weight, thus making the loss of weight more easily detectable.

It is one object of this invention, therefore, to provide a holder for supporting metallic coupons in conduits, which holder is adapted to rigidly support coupons having a high surface-to-weight ratio.

It is another object of this invention to provide a coupon holder which is adapted to support coupons in a conduit at a location at which fluid flowing through the conduit is not subject to turbulence such as occurs, for instance, at turns or bends of the conduit.

It is a further object of this invention to provide a coupon holder for insertion in a conduit and which is adapted to rigidly support metallic coupons having a high surface-to-weight ratio in such manner as to prevent their contact with the metallic surfaces of the conduit.

It is a still further object to provide a holder for supporting metallic coupons in a conduit, which holder is adapted to support a plurality of coupons in side by side relationship in such manner as to prevent their contact with each other or with the walls of the conduit.

Other objects and advantages will become apparent from the following description taken in connection with the accompanying drawing.

In the drawing, Figure 1 is a perspective view of the novel coupon holder of this invention.

Briefly this invention is concerned with means for mounting metallic corrosion-testing coupons having a high surface-to-weight ratio at a location in a conduit remote from areas of turbulence of fluid flowing through the conduit. The means is also adapted to support the coupons in such a manner as to prevent their contact with the walls of the conduit so as to eliminate electrolytic action on the coupons by stray currents which might be present in the conduit.

Figure 1:
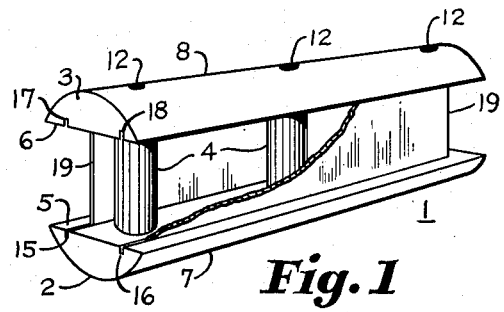

Referring now to Figure 1 of the drawings, numeral 1 designates the coupon holder of the present invention. The coupon holder comprises a lower base member 2 and an upper base member 3 which are held in spaced relationship by spacers 4. The upper surface 5 of lower base member 2 and lower surface 6 of upper base member 3 are preferably flat and parallel with each other. The lower lateral surface 7 of lower base member 2 and the upper lateral surface 8 of upper base member 3 are preferably shaped so as to conform to the interior surface of the tubing into which the coupon holder is to be placed, as will appear in more detail hereinafter. In the particular embodiment shown, the surfaces 7 and 8 are of such shape as to conform to the inside wall of a cylindrical tubing. The upper and lower base members and the spacers are preferably held together, as more clearly shown in Figure 2, by bolts 9 which pass through upper member 3, longitudinal bores 10 in each of the spacers 4, and lower base member 2, and have nuts 11 secured to the lower ends thereof. Preferably, recesses 12 are counterbored into the upper surface of base member 3 to accommodate the heads 13 of bolts 9, and similar recesses 14 are counterbored in the lower surface of lower base member 2 to accommodate the nuts 11, in order that the heads of the bolts and the nuts will not extend beyond the outside surfaces of the base members. It will be understood that base members 2 and 3, and preferably also spacers 4, are made of an electrically-insulating oil-resistant material, such as Bakelite or hard synthetic rubber.

In the particular embodiment shown, a pair of slots 15 and 16 are provided in the upper surface 5 of lower base member 2, said slots being parallel with each other and parallel with the longitudinal axis of the base member 2. Likewise, a pair of slots 17 and 18 are provided in the lower surface 6 of upper base member 3, said slots being parallel with the longitudinal axis of base member 3, said slot 17 lying directly above, and parallel with, slot 15, and slot 18 lying directly above, and parallel with, slot 16.

Figure 3:
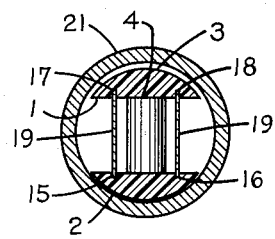
Figure 3 is a cross sectional view taken on line 3—3 of Figure 2.

These slots, as more clearly shown in Figure 3, are adapted to support, in side-by-side relationship, a pair of substantially identical thin rectangular metallic coupons 19 of known corrosion characteristics, one having its lower and upper edges engaged respectively in slots 15 and 17, and the other having its lower and upper edges engaged respectively in slots 16 and 18. Although one coupon is theoretically sufficient to check the corrosiveness of a fluid, it has been found desirable to employ the coupons in pairs in order that the results indicated by the separate coupons may be compared with each other as a check on the corrosion characteristics of the coupons. Thus, if the corrosiveness of the fluid appears to have two different values as indicated by unequal weight loss in the two substantially identical coupons, the need for a check on the control of the corrosion characteristics of the coupons is indicated.

It will be realized, of course, that the dimensions of the slots 15, 16, 17, and 18 are not critical, it being merely necessary that the width of the slots be slightly greater than the thickness of the coupons to be accommodated, and that the distance between the bottoms of slots 15 and 16, respectively, and the tops of slots 17 and 18, respectively, be slightly greater than the width of the coupons to be accommodated, whereby said coupons may be relatively easily inserted into, and removed from, the slots without binding against the surfaces thereof.

Since coupons mounted in holder 1 are supported throughout their entire length with their lower edges in the slots provided in the upper surface of lower base member 2 and their upper edges in slots provided in the lower surface of upper base member 3, it will be appreciated that relatively thin coupons, having a high ratio of surface-to-weight, may be supported without danger of their being bent or otherwise forced into contact with the walls of the conduit in which the holder is placed. For example, holders of the type described have been employed to support coupons 9½ inches long by 2¾ inches wide having a thickness of only .004 inch.

Figure 2:
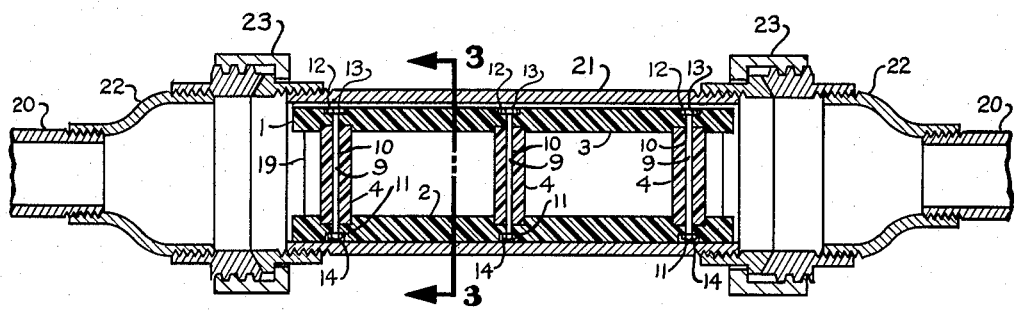
Figure 2 is a longitudinal cross-section of a conduit showing a preferred method of mounting the novel coupon holder therein.

In Figures 2 and 3 there is shown an installation whereby coupon holder 1 is mounted to subject the coupons 19 held thereby to fluid flowing through conduit 20 without at the same time seriously impeding the flow of said fluid. This installation comprises a section of tubing 21 slightly greater in length than coupon holder 1 and which is adapted to be coupled in series with conduit 20, as for instance by reducers 22 and coupling nuts 23, so that fluid passing through conduit 20 will pass also through tubing 21. It will be understood that the diameter of tubing section 21 is not critical but is preferably large enough to accommodate a coupon holder in which the unobstructed transverse cross sectional area between lower base member 2 and upper base member 3 is at least as great as the transverse cross sectional area of conduit 20. It will be appreciated that under these circumstances the presence of coupon holder 1 in tubing section 21 will not result in any substantial diminishing of the flow of fluid through conduit 20. Also, by making tubing section 21 larger in diameter than conduit 20, and employing a coupon holder 1 which will fit closely in tubing 21, as shown in Figure 3, but which is too large in transverse cross-section to fit into conduit 20, it will be understood that the coupon holder will be prevented from being carried through the conduit along with the fluid flowing therethrough.

It will be appreciated that enlarged tubing section 21 may be left permanently connected in any conduit 20 carrying fluid the corrosiveness of which it is desired to check periodically. Then, when it is desired to make a check of the corrosiveness of the fluid, valves, not shown, may be closed to isolate the section of conduit in which tubing section 21 is included, and coupling nuts 23 backed off to facilitate the removal of section 21 to permit the insertion thereinto of the coupon holder 1 carrying suitable coupons 19 of known weight. Upon recoupling tubing section 21 to reducers 22, the valves may be opened to permit the fluid to be tested to pass in contact with the coupons. After a desired measured length of time, the holder may be withdrawn by again disassembling tubing section 21, in order that the coupons may be removed and weighed as a measure of the corrosiveness of the fluid which has passed over them. After removal of the coupons, tubing section 21 may again be coupled to reducers 22, either with or without coupon holder 1 mounted therein, in order that flow through conduit 20 may continue if desired.

While there has been shown and described a preferred embodiment of the novel coupon holding device of this invention, it will be appreciated that many minor changes may be made thereto without departing from the spirit and scope of the invention. Therefore, it will be understood that the invention is limited only in accordance with the appended claims.

We claim:

1. A coupon holder adapted to be inserted into a section of tubing for exposing a coupon held thereby to the corrosive action of fluid flowing through said tubing comprising an elongated lower base member of electrically insulating material having its lower surface adapted to conform to the interior of said tubing and having a substantially flat upper surface, an elongated upper base member of electrically insulating material having its upper surface adapted to conform substantially to the interior surface of said tubing and having a substantially flat lower surface, spacer means of electrically insulating material mounted between said base members whereby to hold said base members in spaced relationship with the lower surface of said lower base member and the upper surface of said upper base member substantially in contact with the interior surface of said tubing and the upper surface of said lower member and the lower surface of said upper member substantially parallel with each other, there being a groove formed in the upper surface of said lower member parallel with the longitudinal axis thereof and a corresponding longitudinal groove formed in the lower surface of said upper member, said second groove lying directly above and parallel with said first groove, whereby a rectangular metallic coupon may be supported with its opposite edges engaged one in each of said grooves.

2. A coupon holder adapted to be inserted into a section of tubing for exposing coupons to the corrosive action of fluid flowing through said tubing comprising an elongated lower base member of electrically insulating material having its lower surface adapted to conform to the interior of said tubing and having a substantially flat upper surface, an elongated upper base member of electrically insulating material having its upper surface adapted to conform substantially to the interior surface of said tubing and having a substantially flat lower surface, spacer means of electrically insulating material mounted between said base members whereby to hold said base members in spaced relationship with the lower surface of said lower base member and the upper surface of said upper base member substantially in contact with the interior surface of said tubing and the upper surface of said lower member and the lower surface of said upper member substantially parallel with each other, there being a plurality of grooves formed in the upper surface of said lower base member parallel with the longitudinal axis thereof, and a plurality of corresponding grooves formed in the lower surface of said upper base member parallel with the longitudinal axis thereof, each of said grooves in said upper base member lying directly above and parallel with one of the grooves in said lower member, whereby a plurality of rectangular metallic coupons may be supported with their respective upper edges each in one of the grooves in said upper member and their lower edges in the corresponding grooves in the lower member.

3. Apparatus for mounting a flat rectangular metallic coupon for contact by a fluid flowing through a conduit comprising: a section of tubing of larger internal diameter than said conduit, means for coupling said tubing in said conduit so that fluid flowing through said conduit will flow also through said tubing, a coupon holder in said tubing, said coupon holder being too large in transverse cross-section to permit it to pass from said tubing into said conduit, said coupon holder comprising two oppositely disposed substantially identical elongated base members of electrically insulating material and a plurality of spacer members of electrically insulating material adapted to hold said base members in spaced relationship with their outer lateral surfaces substantially in contact with the inner surface of said tubing and their inner surfaces substantially parallel to each other, and there being a groove formed in the inner surface of each base member parallel with the longitudinal axis thereof, the groove in one base member being in alignment with the groove in the other base member whereby said coupon may be mounted with its opposite edges engaged one in each of said grooves.

4. Apparatus for mounting a plurality of flat rectangular metallic coupons for contact by a fluid flowing through a conduit comprising: a section of tubing of larger internal diameter than said conduit, means for coupling said tubing in said conduit so that fluid flowing through said conduit will flow also through said tubing, a coupon holder in said tubing, said coupon holder being too large in transverse cross-section to permit it to pass from said tubing into said conduit, said coupon holder comprising two oppositely disposed substantially identical elongated base members of electrically insulating material and a plurality of spacer members of electrically insulating material adapted to hold said base members in spaced relationship with their outer lateral surfaces substantially in contact with the inner surface of said tubing and their inner surfaces substantially parallel with each other, there being a plurality of grooves formed in the inner surface of one of said base members parallel with the longitudinal axis thereof, and a corresponding number of grooves formed in the inner surface of said other base member, each of said second grooves lying directly opposite and in alignment with a corresponding one of said first grooves, whereby said coupons may be mounted with one edge of each in one of said first grooves and the opposite edge of each in a corresponding one of said second grooves.

5. Means for mounting a pair of flat rectangular metallic coupons of substantially equal dimensions in side-by-side relationship for insertion in a conduit comprising a first elongated base member of electrically insulating material having a substantially rectangular upper surface, there being a first pair of grooves formed in said upper surface parallel with the longitudinal axis thereof, said grooves being of substantially equal depth and each being slightly wider than the thickness of said coupons, an upper base member of electrically insulating material substantially identical to said lower base member and having a substantially rectangular lower surface, there being a second pair of grooves formed in said lower surface parallel with the longitudinal axis thereof, said second grooves being substantially equal in depth to said first grooves and also being slightly wider than the thickness of said coupons, one of the grooves in said upper base member lying directly above and in alignment with one of the grooves in said lower member, and the other of the grooves in said upper member lying directly above and in alignment with the other groove in said lower member, and spacer means of electrically insulating material for holding said upper and lower members in spaced parallel relationship with the spacing therebetween being less than the width of said coupons by an amount substantially equal to twice the depth of one of said grooves, whereby one of said coupons may be mounted with its lower edge in one of the grooves in the lower base member and its upper edge in the directly opposite groove in the upper member, and the other of said coupons may be mounted with its lower edge in the other groove in the lower member and its upper edge in the directly opposite groove in the upper member.

HARRELL L. BILHARTZ.
HOWARD E. GREENWELL.

References Cited in the file of this patent

UNITED STATES PATENTS

| Number | Name | Date |
|---|---|---|
| 2,484,279 | Folz | Oct. 11, 1949 |
| 2,519,323 | Shank | Aug. 15, 1950 |

FOREIGN PATENTS

| Number | Country | Date |
|---|---|---|
| 881,874 | France | Feb. 4, 1943 |